United States Patent
Lombardi

(10) Patent No.: US 10,526,439 B2
(45) Date of Patent: *Jan. 7, 2020

(54) HIGH DIELECTRIC BREAKDOWN STRENGTH RESINS

(71) Applicant: John L. Lombardi, Tuscon, AZ (US)

(72) Inventor: John L. Lombardi, Tuscon, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,834

(22) Filed: Apr. 10, 2017

(65) Prior Publication Data

US 2018/0291138 A1 Oct. 11, 2018

(51) Int. Cl.

| | |
|---|---|
| *C08F 283/02* | (2006.01) |
| *C08F 283/00* | (2006.01) |
| *C08G 18/24* | (2006.01) |
| *C08G 18/44* | (2006.01) |
| *C08G 18/48* | (2006.01) |
| *C08G 18/50* | (2006.01) |
| *C08G 18/62* | (2006.01) |
| *C08G 18/81* | (2006.01) |
| *C08G 64/18* | (2006.01) |
| *C08G 65/38* | (2006.01) |
| *C08G 81/02* | (2006.01) |
| *C08J 5/12* | (2006.01) |

(52) U.S. Cl.
CPC ...... *C08G 18/5045* (2013.01); *C08F 283/008* (2013.01); *C08F 283/02* (2013.01); *C08G 18/246* (2013.01); *C08G 18/44* (2013.01); *C08G 18/4879* (2013.01); *C08G 18/6212* (2013.01); *C08G 18/8108* (2013.01); *C08G 64/183* (2013.01); *C08G 65/38* (2013.01); *C08G 81/025* (2013.01); *C08J 5/121* (2013.01); *C08J 2375/08* (2013.01); *C08J 2375/14* (2013.01)

(58) Field of Classification Search
CPC .. C08F 283/008; C08F 283/08; C08F 283/02; C08G 18/5045; C08G 18/4879; C08G 18/6212; C08G 18/8108; C08G 18/246; C08G 18/44; C08G 65/38; C08G 64/183; C08G 81/025; C08J 5/121; C08J 2375/08; C08J 2375/14

See application file for complete search history.

(56) References Cited

U.S. PATENT DOCUMENTS

| | | | |
|---|---|---|---|
| 2006/0173142 A1* | 8/2006 | Nava .......................... | C08F 8/30 525/540 |
| 2007/0191540 A1* | 8/2007 | Nunoshige ............. | C08G 65/44 524/611 |
| 2009/0001356 A1* | 1/2009 | Novack ............... | H01L 29/4908 257/40 |
| 2018/0009934 A1* | 1/2018 | Lombardi .......... | C08G 18/6212 |

* cited by examiner

*Primary Examiner* — Patrick D Niland
(74) *Attorney, Agent, or Firm* — Dale F. Regelman; Grossman, Tucker, Perreault & Pfleger, PLLC

(57) ABSTRACT

A resin formulation that can be cured thermally or by light, where the cured resin is an amorphous, thermoset polymer.

15 Claims, No Drawings

HIGH DIELECTRIC BREAKDOWN STRENGTH RESINS

CROSS REFERENCE TO RELATED APPLICATIONS

This present application is a U.S. Non-Provisional patent application of U.S. Provisional patent application having Ser. No. 62/320,295, filed on Apr. 8, 2016, which is hereby incorporated by reference herein.

FIELD OF THE INVENTION

This invention relates to a resin formulation that can be cured thermally or by light, wherein the cured resin comprises an amorphous, thermoset polymer.

BACKGROUND OF THE INVENTION

A need exists for better performing dielectrics for high energy applications such as those utilized in high power microwave (HPM) systems. In addition, it would be desirable to rapidly and economically process these dielectrics into complex shaped components.

SUMMARY OF THE INVENTION

Photocurable stereolithographic (SLA) resins were initially developed in lieu of 3D printable fused deposition modeling (FDM) thermoplastic feedstock given that the former can typically be printed at much higher dimensional resolution/accuracy and also lent themselves towards easier compositional "tuning" adjustment than the latter approach. Furthermore, low viscosity resins also offer the ability to be thermally cured within conventional low cost tooling, thereby offering an alternative means for prototype production in lieu of SLA 3D printing methods.

Initial efforts were directed to developing a low viscosity resin which could be efficiently addition polymerized into a high molecular weight polymer. Addition polymerization routes were selected on the basis that they typically proceed cleanly and efficiently and do not produce reaction by-products which would otherwise need to be removed from the 3D layers during 3D printing operations.

The goal to formulate a resin composed of a polyfunctional unsaturated oligomer blended with low viscosity diluent monomers. By varying the ratio between the oligomer and diluent, it would be possible to prepare photocurable formulations compatible with conventional SLA type 3D printers. Target properties include:
  Low inherent viscosity ($\eta$<0.8 centipoise);
  Low surface tension (e.g. $\gamma$<35 dyne-$cm^{-1}$; ensuring facile wettability and accurate deposition of adjacent 3-D printed layers);
  Hydrophobicity ($H_2O$ sorption promotes undesired treeing and premature dielectric breakdown;
  Low acute toxicity ($LD_{50}$>2000 mg/Kg body weight);
  Very low vapor pressures (e.g. 14-fold lower than conventional styrene monomer; and
  Consideration for operator exposure given open SLA printer feedstock baths);
  Substituted-styrene monomers were inexpensive, costing about 100 fold less than competing conventional fluorinated dielectric polymer resins, and are commercially available in bulk 55 gallon drum quantities.

DETAILED DESCRIPTION OF THE PREFERRED EMBODIMENTS

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Disclosed is a resin formulation that can be cured thermally or by light, wherein the cured resin comprises an amorphous, thermoset polymer. By "light," Applicant means any electromagnetic radiation, whether in the visible spectrum, infrared spectrum, or ultraviolet spectrum.

It is advantageous to develop chemical compositions that are capable of producing complex-shaped electrical components from high dielectric breakdown strength resins using 3D Printing methods. 3D Printing methods offer an attractive means for rapidly manufacturing complicated geometries but unfortunately conventional printing processes are only capable of producing inferior parts from acrylic resins which are moisture sensitive and have inherently low dielectric breakdown strength.

Photocurable stereolithographic resins were developed in lieu of 3D printable fused deposition modeling thermoplastic feedstock because the former can be printed at much higher dimensional resolution/accuracy. In addition, photocurable stereolithographic resins can be compositionally "tuned" to maximize desirable properties. Furthermore, low viscosity resins can be thermally cured using conventional low cost tooling, thereby offering an alternative means for prototype production in lieu of using 3D printing methods.

Initial efforts focused upon developing a low viscosity resin which could be efficiently addition polymerized into a high molecular weight polymer. Addition polymerization routes were selected on the basis that they typically proceed cleanly and efficiently and do not produce reaction by-products which would otherwise need to be removed from the 3D layers during 3D printing operations.

The goal was to formulate a resin composed of a polyfunctional unsaturated oligomer blended with low viscosity diluent monomers. By varying the ratio between the oligomer and diluent, it would be possible to prepare photocurable formulations compatible with conventional 3D printers.

Applicant's resin can be deposited in single and/or multiple layer deposition fashion to produce a desired three dimensional shape/body. Examples of single layer deposition include film casting or similar methods employed in conventional coating operations (i.e. but not limited to gravure coating, roll to roll coating, doctor blade extrusion, chemical vapor deposition, physical vapor deposition, spraying, spin coating, dip coating, epitaxial and lamination methods) followed by thermal or photo-curing; producing a desired thermoset polymer.

In certain embodiments, such a three dimensional body is formed, using Applicant's resin formulation, on a surface comprising one or more metals, and/or one or more metal ions. Once cured, the newly-formed three dimensional body comprises a thermoset resin, i.e. the resin has cross-linked into essentially a single molecule. It would be desirable if this single molecule defining a three dimensional body were chemically attached to the surface comprising one or more metals, and/or one or more metal ions.

In certain embodiments, Applicant's resin formulations of Tables 9, 10, and 12-17, inclusive, where those resins are cured by light, may further comprise an unsaturated monomer comprising a moiety capable of bonding with a Group II through Group XII, inclusive, metal/ion. In certain embodiments, such moieties include, without limitation, —COOH, —NH$_2$, —NH-Alkyl, —N-(Alkyl)$_2$, NH—CO—, OH, O-Alkyl, SH, —S-Alkyl, —HS—CO—, HS—CS—.

Casting can either be conducted within the confines of a mold or unsupported within free space. Various particulate and/or fibrous fillers can be incorporated into each layer to impart unique thermal, mechanical, electrical, chemical or barrier properties to each layer. The chemical composition and concentration of fillers within these layers can be identical or vary from layer to layer.

In certain embodiments, Applicant's resin formulation may be disposed within a housing formed from one or more metals, and/or one or more metal ions. Once again, in certain embodiments, it may be desirable if the cured thermoset resin, i.e. the cross-linked single molecule defining a three dimensional body, were chemically attached to the surface of the housing, where that surface comprises one or more metals, and/or one or more metal ions.

In certain embodiments, Applicant's resin formulations of Tables 9, 10, and 12-17, inclusive, where those resins are cured by heat, may further comprise an unsaturated monomer comprising a moiety capable of bonding with a Group II through Group XII, inclusive, metal/ion. In certain embodiments, such moieties include, without limitation, —COOH, —NH$_2$, —NH-Alkyl, —N-(Alkyl)$_2$, NH—CO—, OH, O-Alkyl, SH, —S-Alkyl, —HS—CO—, HS—CS—.

Applicant's resin can also be deposited and thermally or photo-cured as a series of discrete layers stacked upon one another. Rapid prototyping and 3D Printing are examples of such multiple layer deposition methods.

Applicant's cured resin product is an amorphous, thermoset polymer exhibiting an unusual combination of properties including high glass transition/high heat distortion temperature accompanied by high dielectric breakdown strength and chemical resistance. Due to its hydrophobic nature, the cured resin comprises these properties even at high ambient humidity levels which would otherwise be deleterious to conventional polymer dielectrics. In certain embodiments, Applicant's cured resin is optically transparent when formed using unfilled resin formulations or from filled resin formulations comprising low optical scattering effects due to particle geometry, refractive index match and concentration.

Both styrenic and maleimide derivatives readily addition polymerize to high molecular weight polymer products. Alkyl substituted styrenics, particularly 4-tert butyl styrene 1 and para-methyl styrene 2 were evaluated as candidate reactive diluents.

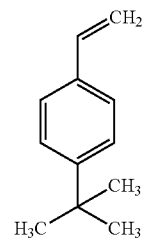

1

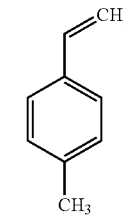

2

Substituted styrenes 1 and 2 each comprise the following properties:
Low inherent viscosity ($\eta$<0.8 centipoise);
low surface tension (e.g. $\gamma$<35 dyne-cm-1; ensuring facile wettability & accurate deposition of adjacent 3-D printed layers);
hydrophobicity (H$_2$O sorption promotes undesired treeing & premature dielectric breakdown (1);
low acute toxicity (LD50>2000 mg/Kg body weight);
very low vapor pressures (e.g. 14-fold lower than conventional styrene monomer; a consideration for operator exposure given open SLA printer feedstock baths);
substituted styrene 1 is available in commerce costing about 100 fold less than conventional fluorinated dielectric polymer resins.

Further the physical and reactivities of these alkyl substituted styrenic monomers 1 and 2 differ significantly from conventional styrene as can be seen from the data within the Table 1A, below. Monomers 1 and 2 comprise properties necessary for a candidate 3D printing resin including low volumetric shrinkage and exotherm upon addition polymerization high thermal and volumetric shrinkage stresses can accumulate within 3D printed part layers and detract from the overall integrity and dimensional accuracy of the printed part.

TABLE IA

Difference in Monomer Properties between Cmpd 1 and 2 versus Styrene

| Monomer | 1 | 2 | STYRENE |
|---|---|---|---|
| Viscosity $\eta$ (cps @ 40° C.) | 0.5 | 0.79 | 0.72 |
| Surface Tension $\gamma$ (dyne-cm$^{-1}$ @ 25° C.) | 29 | 34 | 32 |
| Toxicity LD$_{50}$ (mg/Kg) | >2000 | >5000 | >2000 |
| Monomer Vapor Pressure (atm @ 40° C.) | 0.00132 | 0.00526 | 0.0184 |
| Heat of Polymerization (BTU/lb.) | 191 | 244 | 288 |
| Volume % Polymerization Shrinkage | 7.3 | 13 | 20.6 |
| Polymer Vicat Heat Distortion Temp (° C.) | 145 | 119 | 95 |

Styrenic and polyimide polymers exhibit high dielectric breakdown field strengths (e.g. polystyrene >19 MV/m$^2$. The significant breakdown strength associated with styrenic polymers has been attributed to the presence of aromatic rings within its chemical structure. This enables the polymer to rapidly dissipate applied electrical field energy and resultant corona via formation of various stable primary and secondary aromatic radicals; ultimately preventing polymer chain scission and material breakdown.

Similarly, polyimides were also selected as candidate 3D printable copolymer resin components given their outstanding thermal, mechanical and electrical properties. Copolymerization between substituted styrenes 1 and 2 and a maleimide 8. In certain embodiments, unsubstituted maleimide is used, i.e. R3 is hydrogen. In certain embodiments, R3 is phenyl, i.e. N-Phenyl Maleimide. In certain embodiments, R3 is cyclohexyl. In certain embodiments, R3 is N-linear alkyl.

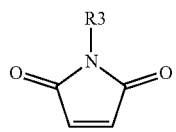

8

For example, substituted styrene 1 or 2 copolymerizes with maleimide 8 to give alternating copolymer 16

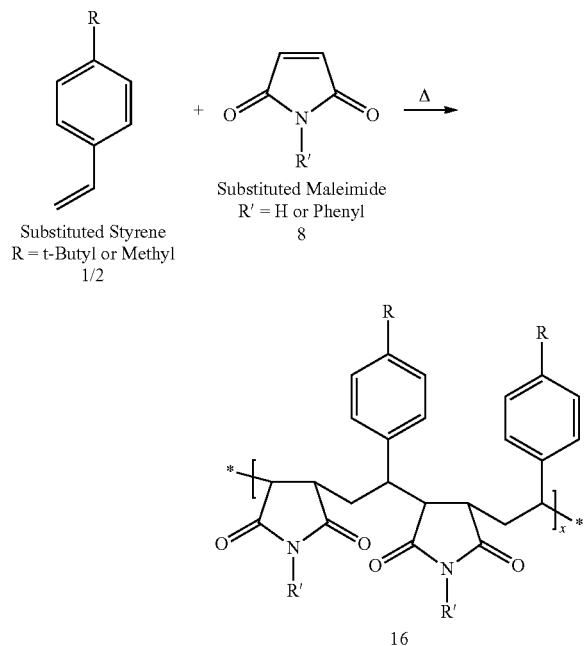

Table 1B recites certain properties for copolymer 16.

TABLE 1B

| Property | Value |
|---|---|
| Dielectric Constant ε | 2.70[a] |
| Loss Tangent (10 GHz) δ (ASTM D150) | 0.00238[a] |
| Dielectric Breakdown Strength (ASTM D149) | >160 KV/mm (cast)[b] |

TABLE 1B-continued

| Property | Value |
|---|---|
| Dielectric Breakdown Strength (ASTM D149) | >80 KV/mm (3D Printed)[b] |
| Glass Transition Temperature (Tg) | 268° C.[c] |

[a]2.48 mm discs thickness using an Agilent E8361A Vector Network Analyzer outfitted with an Agilent 85072A 10 GHz Dielectric Resonator Measurement Kit
[b]0.5 mm thick test specimens immersed in Shell Diala S2 ZX-A insulating oil using a Hipotronics Model 880PL-A power supply
[c]Measure using Mettler Toledo DSC 1 Differential Scanning Calorimeter operating at a 10° C./minute scanning rate The substituted styrene component of copolymer 16 is highly hydrophobic, comprises a high Tg, and is High Voltage Electron Damage Resistant. An N-Phenyl substituted maleimide component of copolymer 16 further enhances hydrophobicity, Tg, and High Voltage Breakdown Strength.

Applicant has found that copolymer 16 is optically transparent. In certain embodiments, copolymer 16 comprises a low viscosity oligomer. In certain embodiments, oligomeric copolymer 16 comprises a viscosity at room temperature less than about 40 cPs.

Applicant has successfully 3D printed a 4"×4"×1 mm test tile using copolymer 16. In addition, Applicant has formed 6" diameter casting which were thermally cured at 130° C. for thirty (30) minutes.

Applicant developed 3-D printing resins using the above low viscosity alkyl substituted styrenic monomer diluents blended with a urethane modified oligomer. In certain embodiments, Applicant utilizes an oligomeric polyol formed by chain growth polymerization of one or more unsaturated monomers, wherein at least one of those monomers comprises a hydroxyl moiety.

In certain embodiments, Applicant utilizes an alternating copolymer formed by copolymerizing styrene and allyl alcohol to form a poly-hydroxy oligomer 3.

In certain embodiments, poly-hydroxy copolymer 3 comprises a number average molecular weight of about 1400 Daltons. In certain embodiments, poly-hydroxy copolymer 3 comprises a maximum number average molecular weight of about 25,000 Daltons. In certain embodiments, poly-hydroxy copolymer 3 comprises a minimum number average molecular weight of about 162 Daltons. This being the case, n is between about 1 and about 150.

Applicant then reacts alternating copolymer 3 with one or more isocyanato alkenes, such as isocyanato alkene 4.

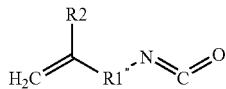

In certain embodiments, isocyanato alkene 4 comprises 3-Isopropenyl-α,α-dimethylbenzyl isocyanate, a substituted styrene 5. In other embodiments, isocyanato alkene 4 comprises a substituted methacrylate 6.

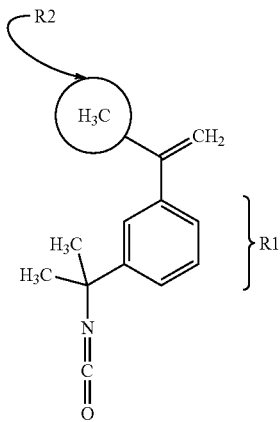

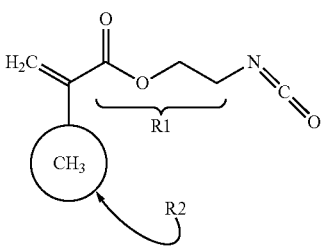

In certain embodiments, Applicant reacts polyol 3 with isocyanato alkene 4 to form a urethane modified alternating copolymer 7, wherein n is between 1 and about 150.

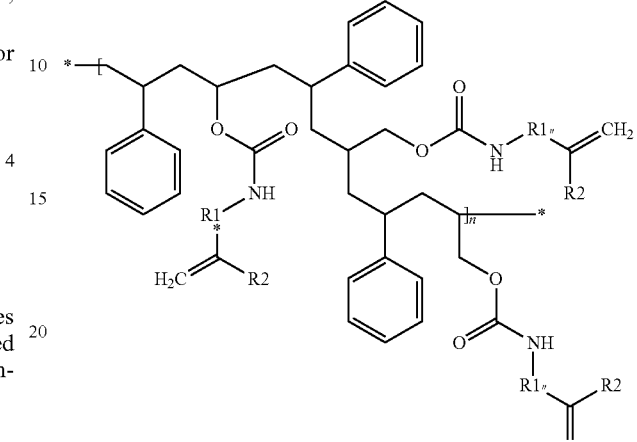

By varying the ratio between substituted styrenes 1 and/or 2 and oligomer 7, Applicant produced formulations having adequate viscosities and curing characteristics suitable for thermal casting and photocurable 3D printing operations respectively.

Various candidate resin blends between styrenes 1 and/or 2 and oligomer 7, were then formulated, cast and thermally cured into 11.43 cm (e.g. 4.5 inch) diameter by 0.5 mm thick test discs. The resins were formed using oligomer 7 dissolved in a mixture of substitute styrenes 1 and 2. Initial testing was performed by casting the resin discs between glass plates followed by thermally initiated addition polymerization to cure the resin into the desired test disc. These discs served as a baseline for the bulk cured candidate dielectric polymer material which would later be compared to corresponding resin parts processed via the SLA method.

Thermal curing was accomplished via addition of an 0.8 weight percent dilauroyl peroxide (LPO) free radical initiator added to the resin followed by heating the glass plate mold for 30 minutes within an isothermal air convection oven operating at 111° C.

TABLE 2

| Component | Function | WEIGHT PERCENT |
|---|---|---|
| MONOMER 1 | Reactive Diluent | 31.2 |
| MONOMER 2 | Reactive Diluent | 26.4 |
| Polystyrene-co-Allyl Alcohol 3 | Oligomer Precursor | 24.8 |
| dimethyl meta-isopropenyl benzyl isocyanate 5 | Oligomer Precursor Monomer | 17.6 |

In certain embodiments, Applicant's composition includes tris (2-hydroxyethyl) isocyanurate triacrylate 8. Table 3 summarizes the components, and weight percentages for same, utilized in a thermally-cured embodiment.

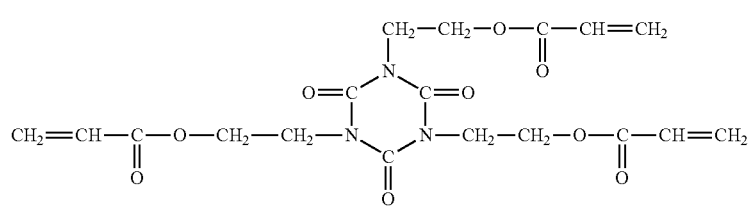

8

TABLE 3

| MONOMER 1 | 21.14% | Trifunctional Monomer 8 | 12.01% |
|---|---|---|---|
| MONOMER 2 | 17.90% | Substituted Maleimide 8 R3 = Phenyl | 12.63% |
| Oligomer 3 | 16.81% | Substituted Maleimide 8 R3 = Hydrogen | 6.53% |
| Isocyanate 5 | 11.93% | Lauryl Peroxide Initiator | 1.05% |

Table 4 recites a monomer mixture that is substantially the same as the monomer mixture of Table 3. Table 4 represents a photo-cured formulation.

TABLE 4

| MONOMER 1 | 21.29% | Trifunctional Monomer 8 | 12.09% |
|---|---|---|---|
| MONOMER 2 | 18.02% | Substituted Maleimide 8 R3 = Phenyl | 12.42% |
| Oligomer 3 | 16.93% | Substituted Maleimide 8 R3 = Hydrogen | 6.42% |
| Isocyanate 5 | 12.01% | Irgacure 819 Photoinitiator | 0.83% |

Thermal analysis was conducted upon both thermally cured as well as photocured resins to determine the glass transition temperatures of the resultant polymers at a 10° C./minute scanning rate. FIG. 1 recites a DSC analysis for a film formed by a thermal cure using the components of Table 3. FIG. 2 recites a DSC analysis for a film formed by a photo-cured using the components of Table 4.

No significant difference was observed between the glass transition temperatures measured for the thermal versus photocured polymer resin samples. Both materials had high glass transition temperatures (Tg) of approximately 268° C. A slight endotherm at 341° C. was attributed in these DSC plots to evaporation of an unreactive impurity present within the original 4-tertbutyl styrene monomer starting material. The high Tg of the polymers was desirable for an electronics application since this indicated that the polymer would presumably remain dimensionally stable and resist degradation when subjected to elevated temperatures often associated with the operation of high power circuits.

Applicant developed a low viscosity, hydrophobic monomer mixture embodiment that produced dielectric components suitable for high power applications. This resin was shelf stable even after standing at 0 degrees Celsius for several hours and was successfully 3D Printed into polymer test specimens.

In this embodiment, Applicant's monomer mixture further comprises N-Vinyl Caprolactam 9. Table 5 recites the components and weight percentages for same for a monomer mixture that includes N-Vinyl Caprolactam 9.

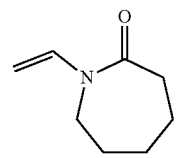

9

In certain embodiments, Applicant's resin formulation comprises SARTOMER SR495B, comprising a caprolactone acrylate 21.

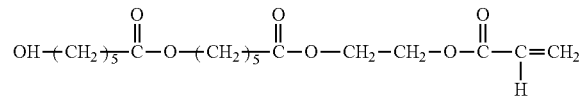

21

TABLE 5

| Component | Concentration (Wgt. %) |
|---|---|
| MONOMER 1 | 19.06 |
| MONOMER 2 | 16.13 |
| Isocyanate 5 | 10.76 |
| Oligomer 3 | 15.16 |
| Lactam 9 | 18.98 |
| Substituted Maleimide 8 R3 = Phenyl | 9.74 |
| Substituted Maleimide 8 R3 = Hydrogen | 4.97 |
| Genorad 20 (Rahn USA) | 0.20 |
| Irgacure 819 (BASF) | 5.0 |

Test coupons formed using the formulation of Table 5 exhibited an unusual combination of thermal and electrical properties, including a dielectric constant and 10 GHz loss tangent of 2.700 and 0.00238 respectively, while exhibiting a high glass transition temperature (Tg) of 268° C. (See table below for results summary.) The resin formed from the components of Table 5 compares quite favorably to commercial, high performance polytetrafluoroethylene insulator sheet of identical thickness. Such commercial polytetrafluoroethylene insulator materials exhibited a 2.107 dielectric constant, 0.00100 loss tangent and a 115° C. Glass Transition Temperature (Tg) respectively.

Table 6 recites properties measured for the resin formed using the components of Table 5.

TABLE 6

| Property | Value |
|---|---|
| Dielectric Constant ∈ | 2.70[a] |
| Loss Tangent (10 GHz) δ | 0.00238[a] |

TABLE 6-continued

| Property | Value |
| --- | --- |
| Dielectric Breakdown Strength (ASTM D149) | >140 KV/mm (cast)[b] |
| Dielectric Breakdown Strength (ASTM D149) | >80 KV/mm (3D Printed)[b] |
| Glass Transition Temperature (Tg) | 268° C.[c] |

[a]Professor Hao Xin at the University of Arizona Department of Electrical and Computer Engineering. Dielectric Testing performed upon 2.48 mm thick discs using an Agilent E8361A Vector Network Analyzer outfitted with an Agilent 85072A 10 GHz Dielectric Resonator Measurement kit.
[b]0.5 mm thick test specimens immersed within Shell Diala S2 ZX-A insulating oil using a Hipotronics Model 880PL-A power supply
[c]Measured using Mettler Toledo DSC 1 Differential Scanning Calorimeter operating at a 10° C./minute scanning rate In certain embodiments, Applicant substitutes Vinylphosphonic acid dimethyl ester 10 for the N-Vinyl Caprolactam 9. Table 7 recites components for this embodiment of Applicant's monomer mixture,

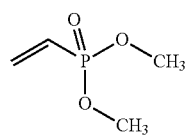

10

TABLE 7

| Component | WEIGHT PERCENT |
| --- | --- |
| MONOMER 1 | 19.805 |
| MONOMER 2 | 16.758 |
| Isocyanate 5 | 11.172 |
| Oligomer 3 | 15.743 |
| Vinyl Phosphic Acid Dimethyl Ester | 16.043 |
| Substituted Maleimide 8 R3 = Phenyl | 10.119 |
| Substituted Maleimide 8 R3 = Hydrogen | 5.16 |
| Genorad 20 Photostabilizer | 0.200 |

In certain embodiments, a chain growth polymer comprising a terminal hydroxyl group, such as and without limitation, polyphenylene oxide 11 wherein n is greater than 1 and less than about 100,000, is reacted with isocyanate 5 using a dibutyl tin dilaurate (DBTDL) catalyst to give an oligomer 12 useable in a chain growth polymerization. In certain embodiments, Applicant replaces oligomer 3 with oligomer 12 in his monomer mixture.

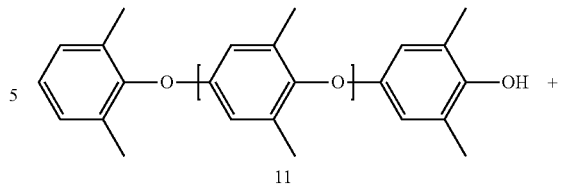

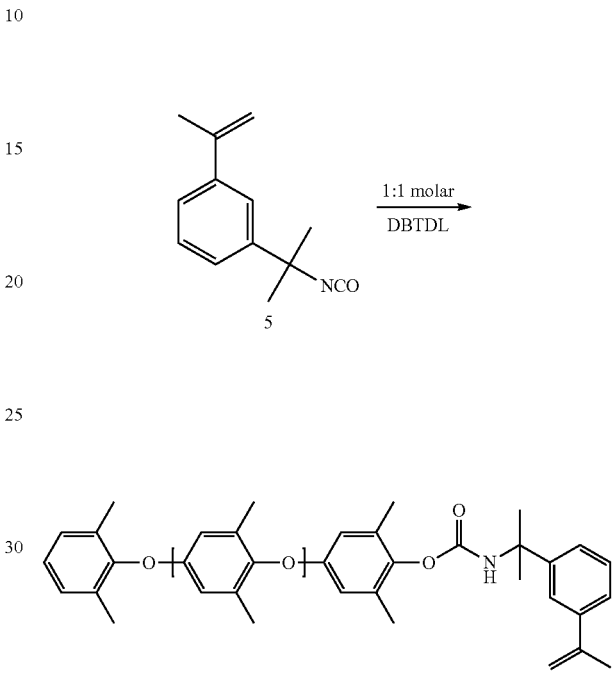

In certain embodiments, a chain growth polymer comprising a terminal hydroxyl group, such as and without limitation, polyphenylene oxide 14 wherein m is greater than 1 and less than about 100,000 and wherein p is greater than 1, and less than about 100,000, and wherein R3 is selected from the group consisting of alkyl, aryl, and oxyalkyl, is reacted with isocyanate 5 using a dibutyl tin dilaurate (DBTDL) catalyst to give an oligomer 15 useable in a chain growth polymerization. In certain embodiments, Applicant replaces oligomer 3 with oligomer 15 in his monomer mixture.

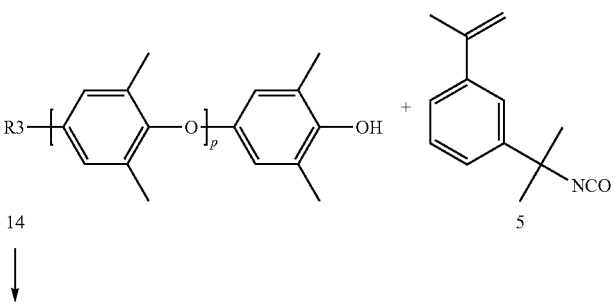

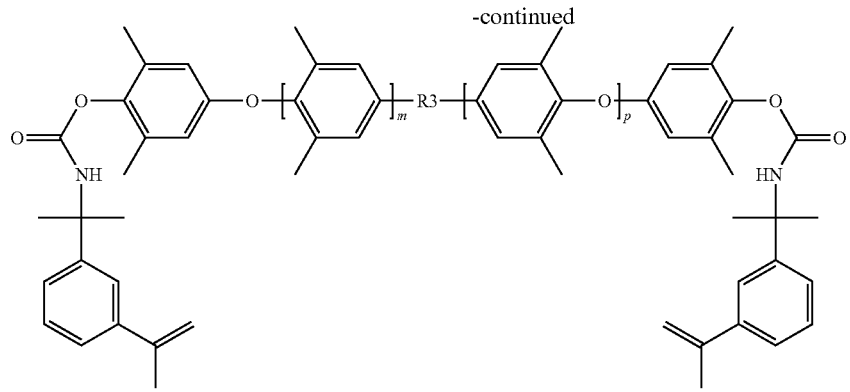

15

In certain embodiments, a chain growth polymer comprising a terminal hydroxyl group, such as and without limitation, polyphenylene oxide 11 wherein n is greater than 1 and less than about 100,000, is reacted with Vinyl Benzyl Chloride 13 to give an oligomer 14 useable in a chain growth polymerization. In certain embodiments, Applicant replaces oligomer 3 with oligomer 14 in his monomer mixture.

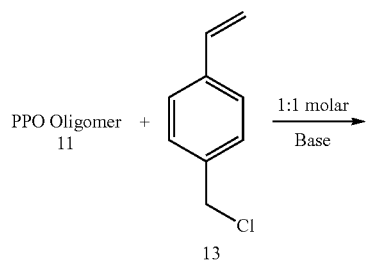

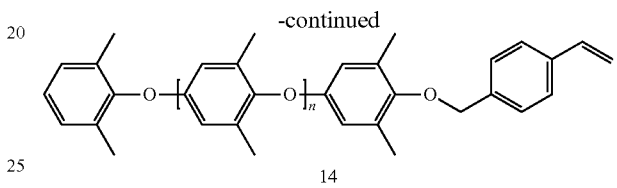

14

Applicant has developed 3D printable resins formed using one or more polycarbonate diols. Polycarbonates received their name because they comprise carbonate groups (—O—(C=O)—O—) in the polymer backbone. A balance of useful features, including temperature resistance, impact resistance and optical properties, positions polycarbonates between commodity plastics and engineering plastics.

For example, Applicant has reacted 2 equivalents of isocyanate 5 with 1 equivalent of diol 18 to give bis-alkene-terminated polycarbonate 19, wherein m is between 1 and about 4, p is between 1 and about 4, and n is between 1 and about 100, and wherein R1, R2, R3, and R4, are each independently selected from the group consisting of H, Alkyl, O-Alkyl, Phenyl, and Aryl.

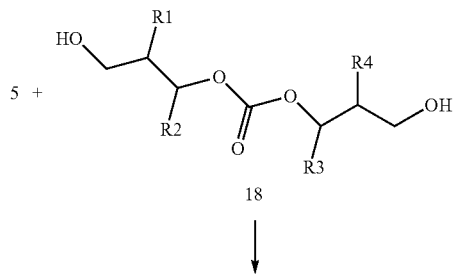

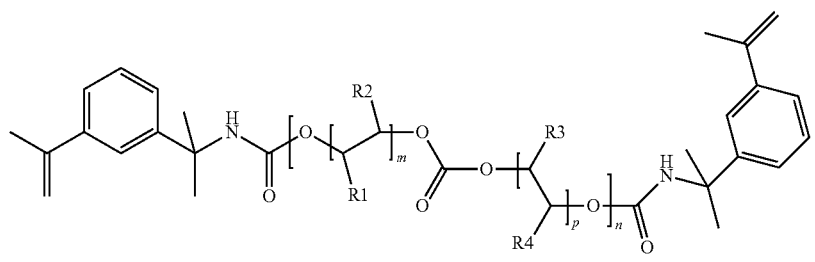

19

Similarly, Applicant has reacted 2 equivalents of isocyanate 5 with 1 equivalent of OXYMER M112 to give bis-alkene-terminated polycarbonate 20, wherein n is greater than or equal to 1, and wherein R1 and R2 are selected from the group consisting of ethyl and butyl.

percent lauroyl peroxide, and effected at 110° C. for 75 minutes. The resulting solid composition was optically transparent, non-sticky, and less flexible than the cured material of Table 9.

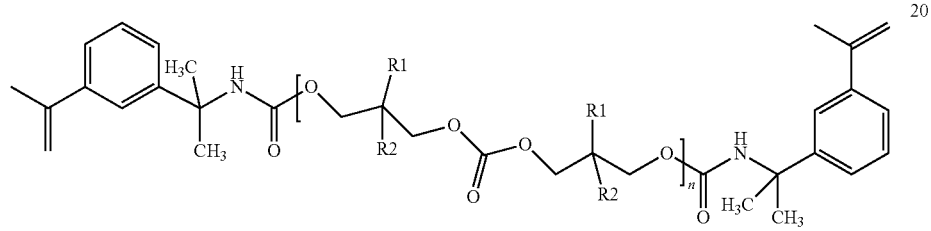

Table 8 recites certain properties for polycarbonate diols OXYMER M112 and OXYMER C112, both sold in commerce by PERSTORP.

TABLE 8

| Macrodiol 1000 g/mol | OH number (mg KOH/g) | Viscosity @ 75° C. (Pas) | $T_g/T_m$ (° C.) |
|---|---|---|---|
| Oxymer M112 | 112 | 1.1 | −23/— |
| Oxymer C112 | 109 | 1.6 | −33/— |
| Hd polycarbonate[1] | 112 | 0.4 | −61/45 |
| Polyester[2] | 112 | 0.4 | −55/— |
| Polyether[3] | 112 | 0.1 | —/31 |
| Polycaprolactone[4] | 112 | 0.1 | —/34 |

[1]Hexane diol polycarbonate
[2]Neopentylglycol-adipic acid
[3]Poly(tetramethylene either) glycol
[4]Neopentylglycol initiated polycaprolactone Table 9 recites Applicant's first polycarbonate diol formulation comprising, among other things, OXYMER M112.

TABLE 9

| Compound | MW g/mol | Mass Weight % |
|---|---|---|
| TBS 1 | 160.26 | 35.10 |
| PMS 2 | 118.18 | 24.35 |
| Oxymer M112 | 1000 | 23.00 |
| Poly-Hydroxy Oligomer 3 | 3100 | 4.944 |
| TMI 5 | 201.3 | 12.60 |

The formulation of Table 9 comprised a homogeneous solution prior to curing. Cure was catalyzed by 0.8 weight percent lauroyl peroxide, and effected at 110° C. for 75 minutes. The resulting solid composition was optically transparent, sticky, and extremely flexible.

Table 10 recites Applicant's second polycarbonate diol formulation comprising, among other things, OXYMER M112.

TABLE 10

| Compound | MW g/mol | Mass Weight % |
|---|---|---|
| TBS 1 | 160.26 | 38.00 |
| PMS 2 | 118.18 | 26.33 |
| Oxymer M112 | 1000 | 12.43 |
| Poly-Hydroxy Oligomer 3 | 3100 | 10.69 |
| TMI 5 | 201.3 | 12.56 |

The formulation of Table 10 comprised a homogeneous solution prior to curing. Cure was catalyzed by 0.8 weight Table 11 recites certain properties for Applicant's polycarbonate diol containing formulations, wherein "Composition A" comprises the resin formulation of Table 9, and wherein "Composition "C" comprises the resin formulation of Table 10.

TABLE 11

| Composition | Average Dielectric Loss Tan δ* | ASTM D149 Dielectric Breakdown Strength (KV/mm)** |
|---|---|---|
| A | 0.0017 | 222 |
| B (Control: Not PC) | 0.0173 | 90 |
| C | 0.0042 | >180 |

*Measurements made 4.321-20.492 GHz using a Damaskos Model 015 Thin Dielectric Sheet Tester
**0.5 mm thick specimens immersed in Shell Diala S2 ZX-A insulating oil using a Hipotronics Model 880PL-A Power Supply Applicant's polycarbonate diol derived compositions comprise an optically transparent resin curing to form an optically transparent thermoset polymer. These systems can be cured with 405 nm laser light. Applicant has successfully 3D printed 4"×4"×1 mm test tiles. In addition, Applicant has prepared cast systems as 6" diameter×1 mm thick test disks prepared by thermal cure at 115° C. for 75 minutes.

Table 12 recites a resin formulation that can be cured thermally or by light.

TABLE 12

| Component | Concentration (Wgt. %) |
|---|---|
| Oxymer HD 112 Aliphatic Polycarbonate Diol | 22.15 |
| TMI Monomer 5 | 9.04 |
| Tert-Butyl Styrene Monomer (TBS) 1 | 27.77 |
| p-Methyl Styrene Monomer (PMS) 2 | 19.32 |
| N-Phenyl Maleimide Monomer 8 R3 = Phenyl | 10.56 |
| Maleimide Monomer 8 R3 = H | 11.06 |

Table 13 recites a resin formulation that can be cured thermally or by light.

TABLE 13

| Component | Concentration (Wgt. %) |
|---|---|
| Caprolactone Acrylate (Sartomer SR 495B) Monomer | 34.84 |
| Tert-Butyl Styrene Monomer (TBS) 1 | 26.18 |
| p-Methyl Styrene Monomer (PMS) 2 | 18.31 |

TABLE 13-continued

| Component | Concentration (Wgt. %) |
|---|---|
| N-Phenyl Maleimide Monomers 8 R3 = Phenyl | 10.09 |
| Maleimide Monomer 8 R3 = H | 10.58 |

Table 14 recites a resin formulation that can be cured thermally or by light.

TABLE 14

| Component | Concentration (Wgt. %) |
|---|---|
| Poly-Hydroxy Oligomer 3 | 15.16 |
| TMI Monomer 5 | 10.76 |
| Tert-Butyl Styrene Monomer (TBS) 1 | 10.06 |
| p-Methyl Styrene Monomer (PMS) 2 | 16.13 |
| N-Phenyl Maleimide Monomer 8 R3 = Phenyl | 9.742 |
| Maleimide Monomer 8 R3 = H | 4.968 |

Table 15 recites a resin formulation that can be cured thermally or by light.

TABLE 15

| Compound | MW g/mol | Mass Weight % |
|---|---|---|
| Modified oxymer HD112 | 1186.3 | 31.19 (22.15% oxymer HD112, 9.04% TMI) |
| TBS 1 | 160.26 | 27.77 |
| PMS 2 | 118.18 | 19.32 |
| Maleimide 8 R3 = H | 97.07 | 11.06 |
| N-Phenylmaleimide 8 R3 = Phenyl | 173.17 | 10.66 |

| Sample Mass (g) | Average Thickness (mm) | Voltage Breakdown (kV) | Theoretical Voltage Breakdown (Kv/mm) |
|---|---|---|---|
| 4.97 | 0.18 | 40 | 222 |

An average loss tangent of 0.0017 was measured for the sample mass produced upon curing.

Table 16 recites a resin formulation that can be cured thermally or by light.

TABLE 16

| Compound | MW g/mol | Mass Weight % |
|---|---|---|
| SR495B caprolactone acrylate | | 34.84 |
| TBS 1 | 160.26 | 26.18 |
| PMS 2 | 118.18 | 18.31 |
| Maleimide 8 R3 = H | 97.07 | 10.58 |
| N-Phenylmaleimide8 R3 = Phenyl | 173.17 | 10.09 |

| Sample Mass (g) | Average Thickness (mm) | Voltage Breakdown (kV) | Theoretical Voltage Breakdown (kV/mm) |
|---|---|---|---|
| 14.36 | 0.83 | 75 | 90 |

An average loss tangent of 0.017 was measured for the sample mass produced upon curing.

Table 17 recites a resin formulation that can be cured thermally or by light.

TABLE 17

| Component | MW g/mol | Concentration (wgt %) |
|---|---|---|
| TBS 1 | 160.26 | 19.06 |
| PMS 2 | 118.18 | 16.13 |
| TMI 5 | | 10.76 |
| Poly-Hydroxy Oligomer 3 | | 15.16 |
| N-Vinylcaprolactam 9 | | 18.98 |
| N-phenylmaleimide 8 R3 = Phenyl | | 9.742 |
| Maleimide 8 R3 = H | | 4.968 |
| Genorad 20 | | 0.200 |
| Irgacure 819 | | 5.000 |

While the preferred embodiments of the present invention have been illustrated in detail, it should be apparent that modifications and adaptations to those embodiments may occur to one skilled in the art without departing from the scope of the present invention.

I claim:

1. A resin formulation that can be cured thermally or by light, wherein the cured resin comprises:

an amorphous, thermoset polymer comprising a dielectric constant less than about 3, a loss tangent measured at 10 GHz of less than 0.01, and a glass transition temperature greater than about 200° C.;

t-butyl styrene; and a compound having a structure:

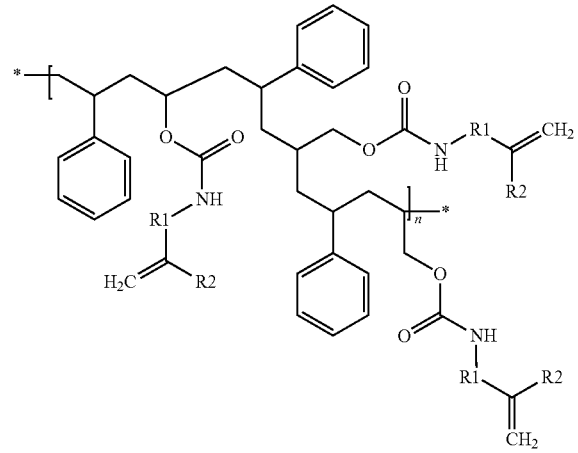

where R1 is

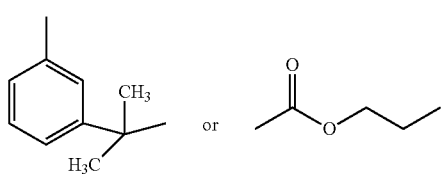

and wherein n is between 1 and about 150;

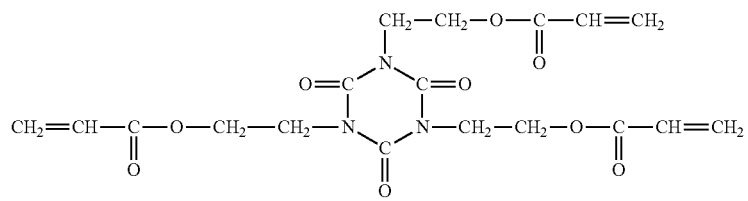

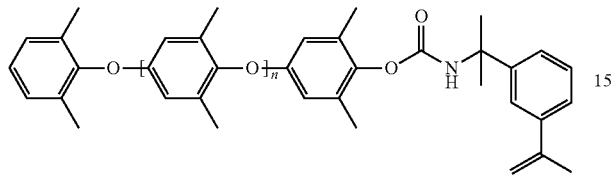

wherein n is greater than or equal to 1 and less than or equal to 100,000;

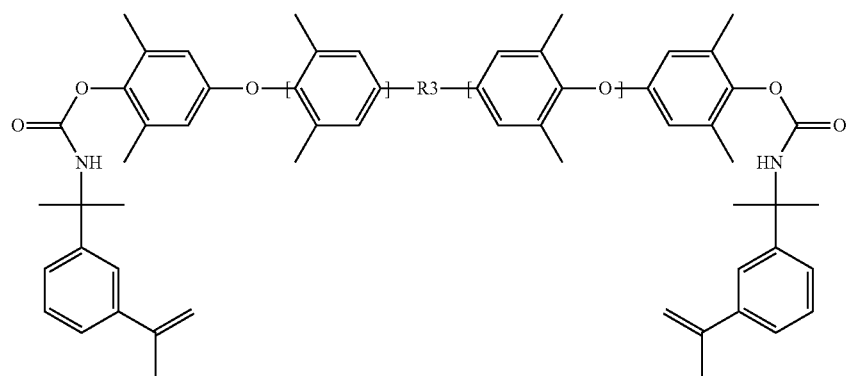

wherein m is greater than 1 and less than about 100,000 and wherein p is greater than 1, and less than about 100,000, and wherein R3 is selected from the group consisting of alkyl, aryl, and oxyalkyl;

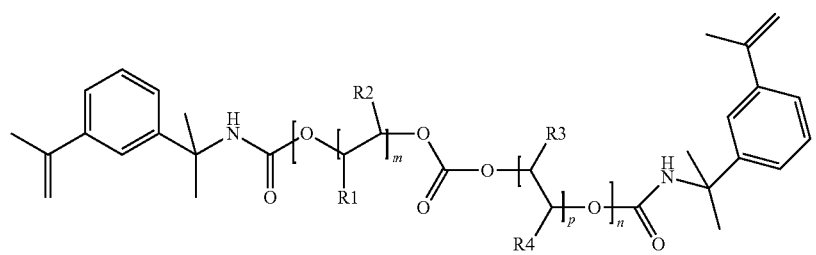

wherein m is between 1 and about 4, p is between 1 and about 4, and n is between 1 and about 100, and wherein R1, R2, R3, and R4, are each independently selected from the group consisting of H, Alkyl, O-Alkyl, Phenyl, and Aryl; and

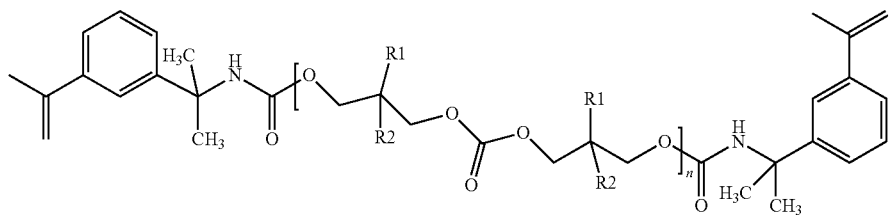

wherein n is greater than or equal to 1, and wherein R1 and R2 are selected from the group consisting of ethyl and butyl.

2. The resin formulation of claim 1, further comprising p-methyl styrene.

3. The resin formulation of claim 2, further comprising maleimide.

4. The resin formulation of claim 3, further comprising N-Phenyl maleimide.

5. The resin formulation of claim 4, further comprising:

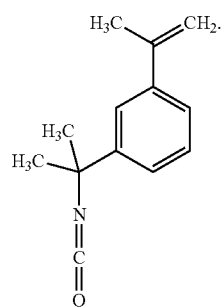

6. The resin formulation of claim 1, wherein said compound comprises:

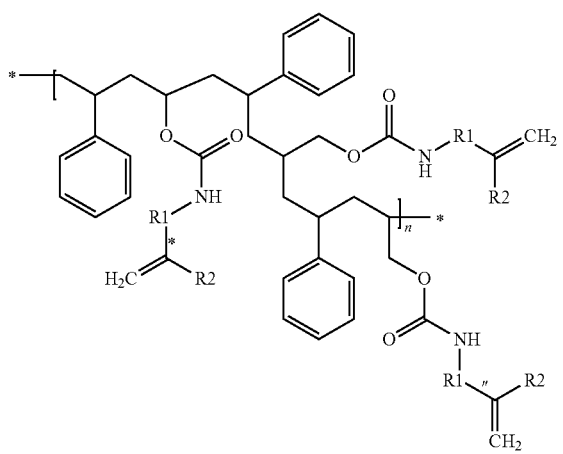

where R1 is

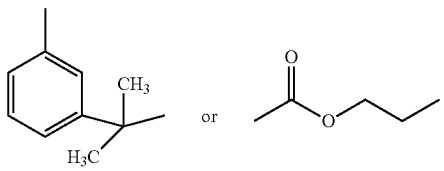

and wherein n is between 1 and about 150.

7. The resin formulation of claim 1, wherein said compound comprises:

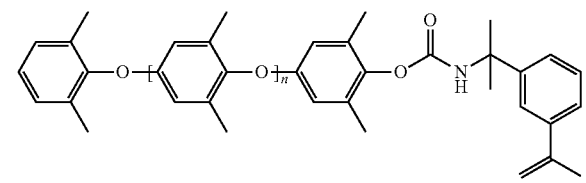

wherein n is greater than or equal to 1 and less than or equal to 100,000.

8. The resin formulation of claim 1, wherein said compound comprises:

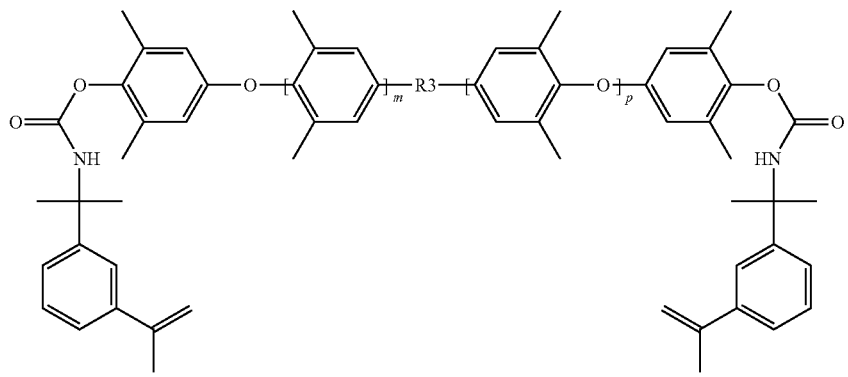

wherein m is greater than 1 and less than about 100,000 and wherein p is greater than 1, and less than about 100,000, and wherein R3 is selected from the group consisting of alkyl, aryl, and oxyalkyl.

9. The resin formulation of claim 1, wherein said compound comprises:

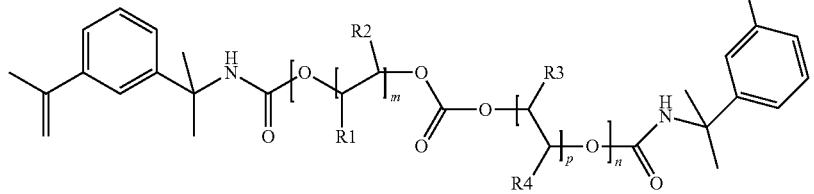

wherein m is between 1 and about 4, p is between 1 and about 4, and n is between 1 and about 100, and wherein R1, R2, R3, and R4, are each independently selected from the group consisting of H, Alkyl, 0-Alkyl, Phenyl, and Aryl.

10. The resin formulation of claim 1, wherein said compound comprises:

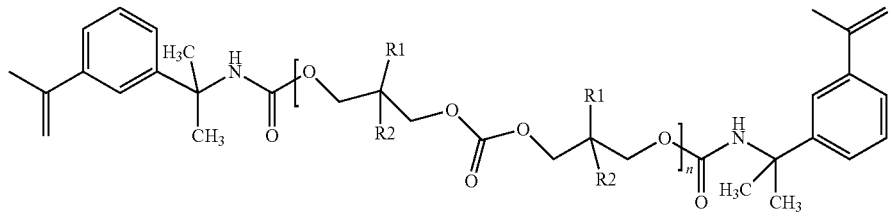

wherein n is greater than or equal to 1, and wherein R1 and R2 are selected from the group consisting of ethyl and butyl.

11. A resin formulation that can be cured thermally or by light, wherein the cured resin comprises an amorphous, thermoset polymer comprising a dielectric constant less than about 3, a loss tangent measured at 10 GHz of less than 0.01, and a glass transition temperature greater than about 250° C., comprising:

caprolactone acrylate (21) at about 34.84 weight percent;
4-t-butyl styrene (1) at about 26.18 weight percent;
p-methyl styrene (2) at about 18.31 weight percent;
N-Phenyl Maleimide (8 R3=Phenyl) at about 10.09 weight percent; and
Maleimide (8 R3=H) at about 10.58 weight percent.

12. A resin formulation that can be cured thermally or by light, wherein the cured resin comprises an amorphous, thermoset polymer comprising a dielectric constant less than about 3, a loss tangent measured at 10 GHz of less than 0.01, and a glass transition temperature greater than about 250° C., comprising:

Poly-Hydroxy Oligomer (3) at about 15.16 weight percent;
3-Isopropenyl-α,α-dimethylbenzyl isocyanate (5) at about 10.76 weight percent;
4-t-butyl styrene (1) at about 10.06 weight percent;
p-methyl styrene (2) at about 16.13 weight percent;
N-Phenyl Maleimide (8 R3=Phenyl) at about 9.74 weight percent; and
Maleimide (8 R3=H) at about 4.97 weight percent.

13. A resin formulation that can be cured thermally or by light, wherein the cured resin comprises an amorphous, thermoset polymer comprising a dielectric constant less than about 3, a loss tangent measured at 10 GHz of less than 0.01, and a glass transition temperature greater than about 250° C., comprising:

caprolactone acrylate (21) at about 34.84 weight percent;
4-t-butyl styrene (1) at about 26.18 weight percent;
p-methyl styrene (2) at about 18.31 weight percent;
N-Phenyl Maleimide (8 R3=Phenyl) at about 10.09 weight percent; and
Maleimide (8 R3=H) at about 10.58 weight percent.

14. The resin formulation of claim 13, wherein a sample formed by curing the formulation of claim 13 comprises a Voltage Breakdown of 75 kV at a thickness of 0.83 mm.

15. The formulation of claim 14, wherein said sample comprises an average loss tangent of 0.017.

* * * * *